United States Patent
Kriegel et al.

(10) Patent No.: US 10,257,639 B2
(45) Date of Patent: Apr. 9, 2019

(54) SPATIAL COMPRESSOR FOR BEAMFORMING SPEAKERS

(71) Applicant: NUNNTAWI DYNAMICS LLC, Wilmington, DE (US)

(72) Inventors: Adam E. Kriegel, Mountain View, CA (US); Daniel C. Klingler, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/755,032

(22) PCT Filed: Aug. 31, 2015

(86) PCT No.: PCT/US2015/047826
§ 371 (c)(1),
(2) Date: Feb. 23, 2018

(87) PCT Pub. No.: WO2017/039633
PCT Pub. Date: Mar. 9, 2017

(65) Prior Publication Data
US 2018/0242097 A1    Aug. 23, 2018

(51) Int. Cl.
*H04M 11/00*    (2006.01)
*H04S 7/00*    (2006.01)
(Continued)

(52) U.S. Cl.
CPC .............. *H04S 7/303* (2013.01); *H04R 1/403* (2013.01); *H04R 3/007* (2013.01); *H04R 3/12* (2013.01);
(Continued)

(58) Field of Classification Search
CPC ................................ H04S 7/303; H04R 1/403
(Continued)

(56) References Cited

U.S. PATENT DOCUMENTS 8,325,941 B2    12/2012    Hooley et al.
8,396,233 B2    3/2013    Ma et al.
(Continued)

FOREIGN PATENT DOCUMENTS

KR    101410975    6/2014
WO    WO2011144499    11/2011
WO    WO2014164234    10/2014

OTHER PUBLICATIONS

International Search Report and Written Opinion, dated Jun. 10, 2016, Application No. PCT/US2015/047826.
(Continued)

*Primary Examiner* — William J Deane, Jr.
(74) *Attorney, Agent, or Firm* — Womble Bond Dickinson (US) LLP

(57) ABSTRACT

An audio receiver receives one or more input audio signals representing one or more channels of a sound content and applies a first beam pattern to the input audio signals to generate a first set of beam-formed audio signals. The audio receiver determines a second beam pattern that is less directional than the first beam pattern. The audio receiver determines that driving of a loudspeaker array using the first set of beam-formed audio signals will cause one or more transducers of the loudspeaker array to operate beyond an operational threshold, and in response applies the second beam pattern to the input audio signals to generate a second set of beam-formed audio signals. The audio receiver drives the loudspeaker array using the second set of beam-formed audio signals. Other embodiments are also described and claimed.

20 Claims, 5 Drawing Sheets

(51) Int. Cl.
  *H04W 64/00*  (2009.01)
  *H04W 8/14*   (2009.01)
  *H04R 1/40*   (2006.01)
  *H04R 3/00*   (2006.01)
  *H04R 3/12*   (2006.01)
  *H04R 5/04*   (2006.01)
  *H04R 5/02*   (2006.01)
  *H04S 3/00*   (2006.01)
  *H04W 8/16*   (2009.01)

(52) U.S. Cl.
  CPC ............ *H04R 5/02* (2013.01); *H04R 5/04* (2013.01); *H04S 3/008* (2013.01); *H04W 8/14* (2013.01); *H04W 64/00* (2013.01); *H04R 2203/12* (2013.01); *H04W 8/16* (2013.01)

(58) Field of Classification Search
  USPC ..................................... 381/303, 300, 306
  See application file for complete search history.

(56) References Cited

U.S. PATENT DOCUMENTS

| | | |
|---|---|---|
| 2007/0263888 A1 | 11/2007 | Melanson |
| 2011/0038486 A1 | 2/2011 | Beaucoup |
| 2011/0058677 A1 | 3/2011 | Choi et al. |
| 2013/0329894 A1 | 12/2013 | Krishnaswamy et al. |

OTHER PUBLICATIONS

PCT International Preliminary Report on Patentability for PCT/US2015/047826 filed Mar. 15, 2018.

SPATIAL COMPRESSOR FOR BEAMFORMING SPEAKERS

This application is a U.S. National Phase Application under 35 U.S.C. § 371 of International Application No. PCT/US2015/047826, filed Aug. 31, 2015.

FIELD

One aspect of this disclosure relates to beamforming speakers, and more specifically to adjusting a beam pattern used by a beamforming speaker to reduce or avoid clipping of audio signals, while essentially maintaining the amount of acoustic energy produced by the beamforming speaker. Other aspects are also described.

BACKGROUND

Loudspeaker arrays may include an array of transducers for outputting sound. An audio receiver or other audio device may drive each transducer of the loudspeaker array with separate audio signals to apply a particular beam pattern to a sound content, to thereby play the sound content in a given direction with a given directivity. If the beam pattern used for audio playback has high directivity, the majority of the sound content will be produced by a small subset of the total drivers in the loudspeaker array. If a driver (e.g., a transducer) in the subset of drivers receives sound content that goes beyond an operational threshold level of the driver, limiting and/or compression is needed. This causes both a distortion of the audio and a reduction of the intended acoustic energy.

BRIEF DESCRIPTION OF THE DRAWINGS

Various aspects of this disclosure are illustrated by way of example and not by way of limitation in the figures of the accompanying drawings in which like references indicate similar elements. It should be noted that references to "an" or "one" embodiment in this disclosure are not necessarily referring to the same embodiment, and they mean at least one. Also, a given figure may be used to illustrate the features of more than one embodiment in the interest of reducing the total number of drawings, and as a result not all elements in the figure may be required for a given embodiment.

DETAILED DESCRIPTION

Figure 1:
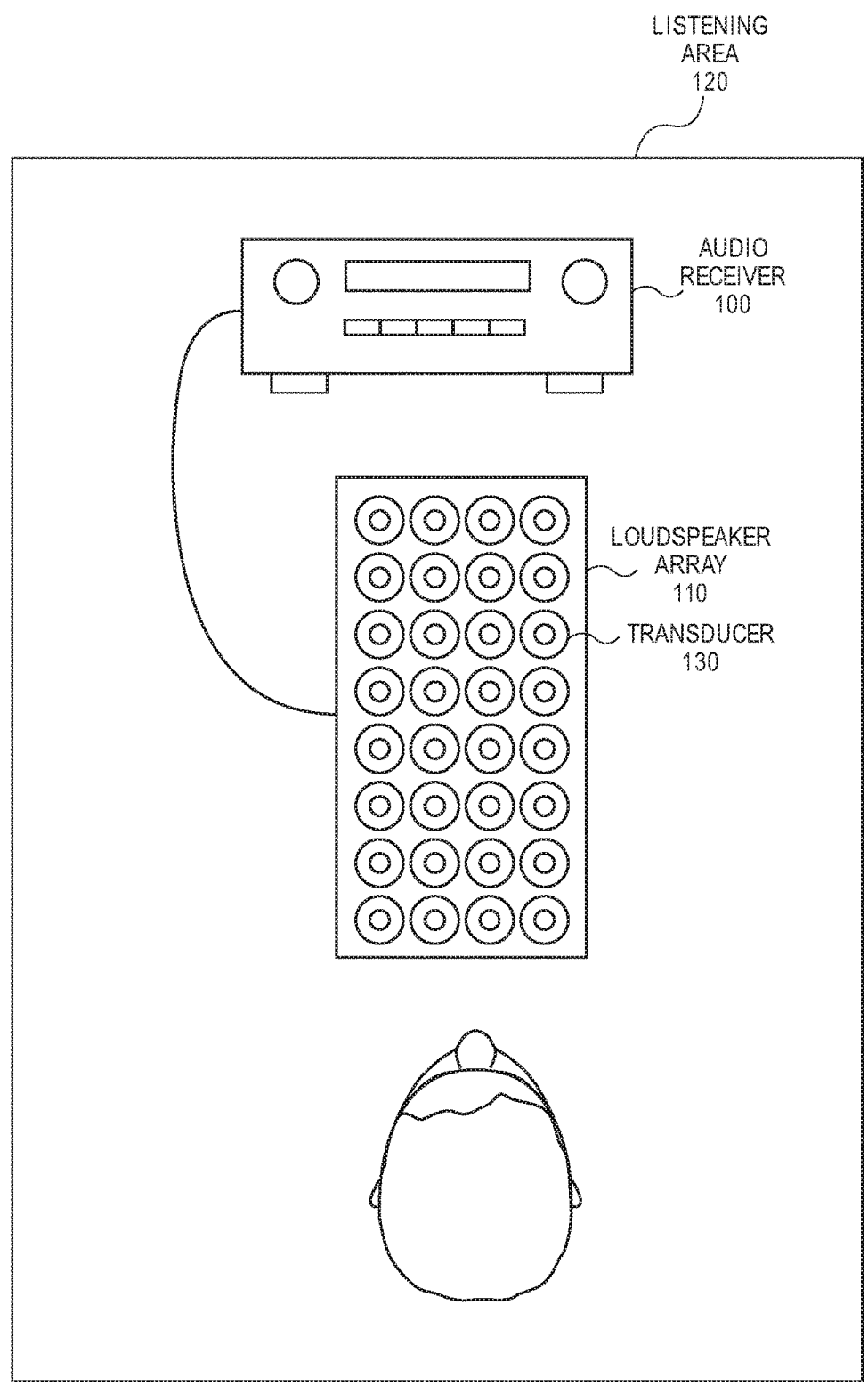
FIG. 1 shows a view of a listening area with an audio receiver and a loudspeaker array, according to some embodiments.

Several embodiments with reference to the appended drawings are now explained. Whenever aspects of the embodiments described here are not explicitly defined, the scope of the disclosure here is not limited only to the parts shown, which are meant merely for the purpose of illustration. Also, while numerous details are set forth, it is understood that some embodiments may be practiced without these details. In other instances, well-known circuits, structures, and techniques have not been shown in detail so as not to obscure the understanding of this description.

As discussed above, if a beam pattern used for audio playback has high directivity, the majority of the sound content will be reproduced by a small subset of the total drivers in a loudspeaker array. If a driver (e.g., a transducer) in the subset of drivers receives sound content that goes beyond an operational threshold level of the driver, limiting and/or compression is needed. This causes both a distortion of the audio and a reduction of the intended acoustic energy.

Options for compressing/limiting audio signals include a linked compression/limiting scheme and an independent compression/limiting scheme. The linked compression/limiting scheme compresses/limits all of the drivers of the loudspeaker array equally. For example, all drivers of the loudspeaker array receive the maximum compression of any driver in the loudspeaker array. An advantage of the linked compression/limiting scheme is that directivity is preserved because all of the drivers in the loudspeaker array are compressed/limited equally. However, a disadvantage of the linked compression/limiting scheme is that the total acoustic energy produced by the loudspeaker array is reduced.

The independent compression/limiting scheme compresses/limits each driver of the loudspeaker array independent of the other drivers of the loudspeaker array. An advantage of the independent compression scheme is that typically, less drivers are compressed/limited, and thus less acoustic energy is lost compared to the linked compression/limiting scheme. A disadvantage of the independent compression scheme, however, is that directivity is changed and some acoustic energy is still lost (albeit not as much as in the linked compression/limiting scheme).

While these two compression/limiting schemes trade off maintaining directivity with audible distortion, both have the negative effect of reducing the total acoustic energy output by the loudspeaker array.

Embodiments provide a spatial compression scheme that essentially preserves the total acoustic energy output by the loudspeaker array. Embodiments can detect if driving a loudspeaker array with a given beam pattern will cause an audio signal intended for a transducer of the loudspeaker array to clip or enter a region of compression. In this event, embodiments fade the problematic beam pattern to a beam pattern that has lower directivity that does not cause clipping, and that essentially preserves the total acoustic energy of the original beam pattern (the problematic beam pattern). This is based on the observation that a beam pattern that produces a given amount of acoustic energy will have a lower peak value than a beam pattern that produces the same amount of energy that has higher directivity. More generally, embodiments reduce or avoid clipping by fading to a beam pattern that has lower directivity.

FIG. 1 shows a view of a listening area with an audio receiver and a loudspeaker array, according to some embodiments. The audio receiver 100 may be coupled to the loudspeaker array 110 to drive individual transducers 130 in the loudspeaker array 110 to play various beam-formed sound content into the listening area 120. If the audio receiver 100 detects that playing the beam-formed sound content will cause an audio signal intended for a transducer 130 of the loudspeaker array 110 to clip or otherwise cause a transducer 130 of the loudspeaker array 110 to become overloaded, the audio receiver 100 may adjust the beam pattern applied to the sound content to a beam pattern with lower directivity, as will be described in further detail below. Adjusting the beam pattern to a beam pattern with lower directivity may reduce or avoid clipping.

As shown, the audio receiver 100 is coupled to a single loudspeaker array 110. However, in other embodiments, multiple loudspeaker arrays 110 may be coupled to the audio receiver 100. For example, three loudspeaker arrays 110 may be positioned in the listening area 120 to respectively represent front left, front right, and front center audio channels of a sound content (e.g., a musical composition or an audio track for a movie) output by the audio receiver 100.

As shown, the loudspeaker array 110 may include wires or conduit for connecting to the audio receiver 100. For example, the loudspeaker array 110 may include multiple wiring points and the audio receiver 100 may include complementary wiring points. The wiring points may be binding posts or spring clips on the back of the loudspeaker array 110 and the audio receiver 100, respectively. The wires are coupled to respective wiring points to electrically couple the loudspeaker array 110 to the audio receiver 100.

In other embodiments, the loudspeaker array 110 may be coupled to the audio receiver 100 using wireless protocols such that the loudspeaker array 110 and the audio receiver 100 are not physically joined but maintain a radio-frequency connection. For example, the loudspeaker array 110 may include a Wi-Fi receiver for receiving audio signals from a corresponding Wi-Fi transmitter in the audio receiver 100. In some embodiments, the loudspeaker array 110 may include integrated amplifiers for driving the transducers 130 therein using the wireless audio signals received from the audio receiver 100. The loudspeaker array 110 may be a stand-alone unit that includes components for audio signal processing and for driving each transducer 130 according to the techniques described herein.

The loudspeaker array 110 may include multiple transducers that are housed in a single cabinet. As shown, the loudspeaker array 110 has thirty-two distinct transducers 130 evenly aligned in eight rows and four columns within a cabinet. In other embodiments, different numbers of transducers 130 may be used with uniform or non-uniform spacing. For instance multiple transducers 130 may be aligned in a single row in a cabinet to form a sound-bar style loudspeaker array 110. In one embodiment, the transducers may be aligned in a flat plane or straight line. In another embodiment, the transducers 130 may be aligned in a curved fashion along an arc. In one embodiment, the transducers 130 may be arranged in a circular fashion, with each transducer 130 facing outward from the center of the circle formed by the transducers. Other suitable arrangements of the transducers are contemplated as well.

The transducers 130 may be any combination of full-range drivers, mid-range drivers, subwoofers, woofers, and tweeters. Each of the transducers 130 may be a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducer's magnetic system interact, generating a mechanical force that causes the coil (and thus, the attached cone) to move back and forth, thereby reproducing sound under the control of the applied electrical audio signal coming from a source (e.g., a signal processor, a computer, or the audio receiver 100).

Each transducer 130 may be individually and separately driven to produce sound in response to separate and discrete audio signals. By allowing the transducers 130 in the loudspeaker array 110 to be individually and separately driven according to different parameters and settings (including delays, frequencies, phases, and energy levels), the loudspeaker array 110 may produce beam-formed sound content to simulate or better represent respective channels of sound content played to a listener. The audio receiver 100 may apply a beam pattern to one or more audio signals that represent one or more channels of a sound content to generate a set of beam-formed audio signals. The set of beam-formed audio signals can be used to drive the loudspeaker array 110 to produce beam-formed sound content.

Figure 2:
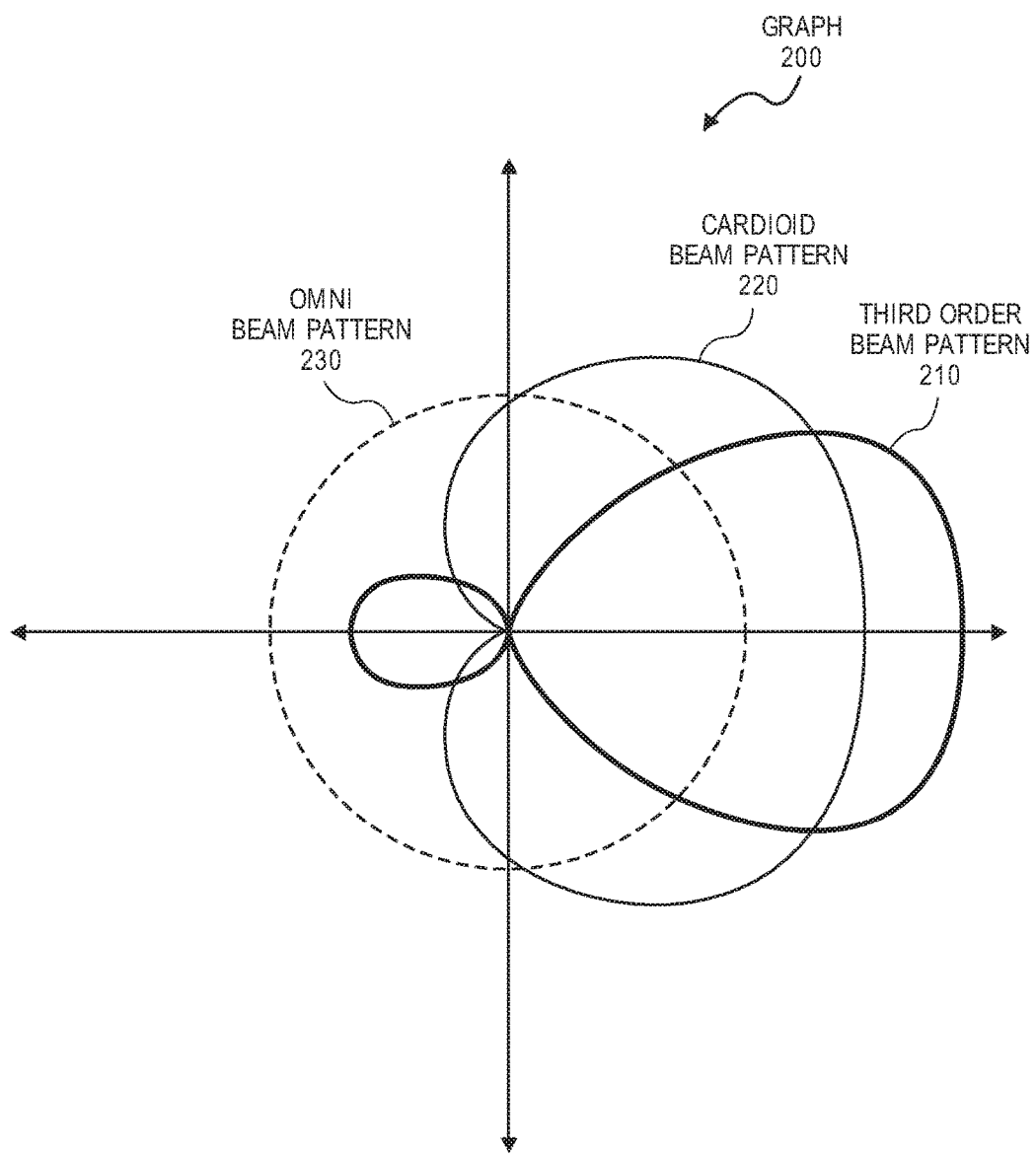
FIG. 2 is a graph showing various types of beam patterns with varying levels of directivity that have constant spatial power, according to some embodiments.

FIG. 2 is a graph showing various types of beam patterns with varying levels of directivity that have constant spatial power, according to some embodiments. The graph 200 shows exemplary beam patterns for a circular beamforming loudspeaker array. The graph 200 shows a third order beam pattern 210, a cardioid beam pattern 220, and an omni beam pattern 230, which all have the same amount of spatial power, e.g., essentially equal sound power emitted in all directions, within a reasonable tolerance of course (e.g., within plus or minus 5 percent of the total acoustic energy). The third order beam pattern 210 is "more directional" or has a greater directivity index (DI) than the cardioid beam pattern 220 as can be observed by the third order beam pattern 210 having a higher peak value than the cardioid beam pattern 220. The cardioid beam pattern 220 is more directional (e.g., has greater DI) than the omni beam pattern 230 as can be observed by the cardioid beam pattern 220 having a higher peak value than the omni beam pattern 230. The three types of beam patterns are provided by way of example and not limitation. Although the graph 200 shows three different types of beam patterns, there can be many other beam patterns with varying levels of directivity that have the same amount of spatial power or sound power (emitted in all directions).

An audio receiver 100 may be configured to drive a loudspeaker array 110 using beam patterns such as the ones shown in FIG. 2 or any other type of beam pattern. In one embodiment, the audio receiver 100 may adjust the beam pattern that it uses to avoid or reduce clipping and/or to avoid overloading the transducers 130 in the loudspeaker array 110. For example, if the audio receiver 100 detects that driving the loudspeaker array 110 with the third order beam pattern 210 will cause clipping of audio signals, then the audio receiver 100 may adjust the beam pattern to the cardioid beam pattern 220, which is "less directional" (e.g., has a smaller DI) than the third order beam pattern 210, but produces essentially the same amount of acoustic energy as the third order beam pattern 210. Adjusting the beam pattern in this way effectively redistributes the acoustic energy from the transducers 130 that are overloaded (or going to be overloaded) to other transducers 130 that are not overloaded or operating below capacity. By adjusting the beam pattern in this way, clipping of audio signals and/or overloading of the transducers 130 can be reduced or avoided, while at the same time essentially maintaining the amount of acoustic energy produced by the loudspeaker array 110.

Figure 3:
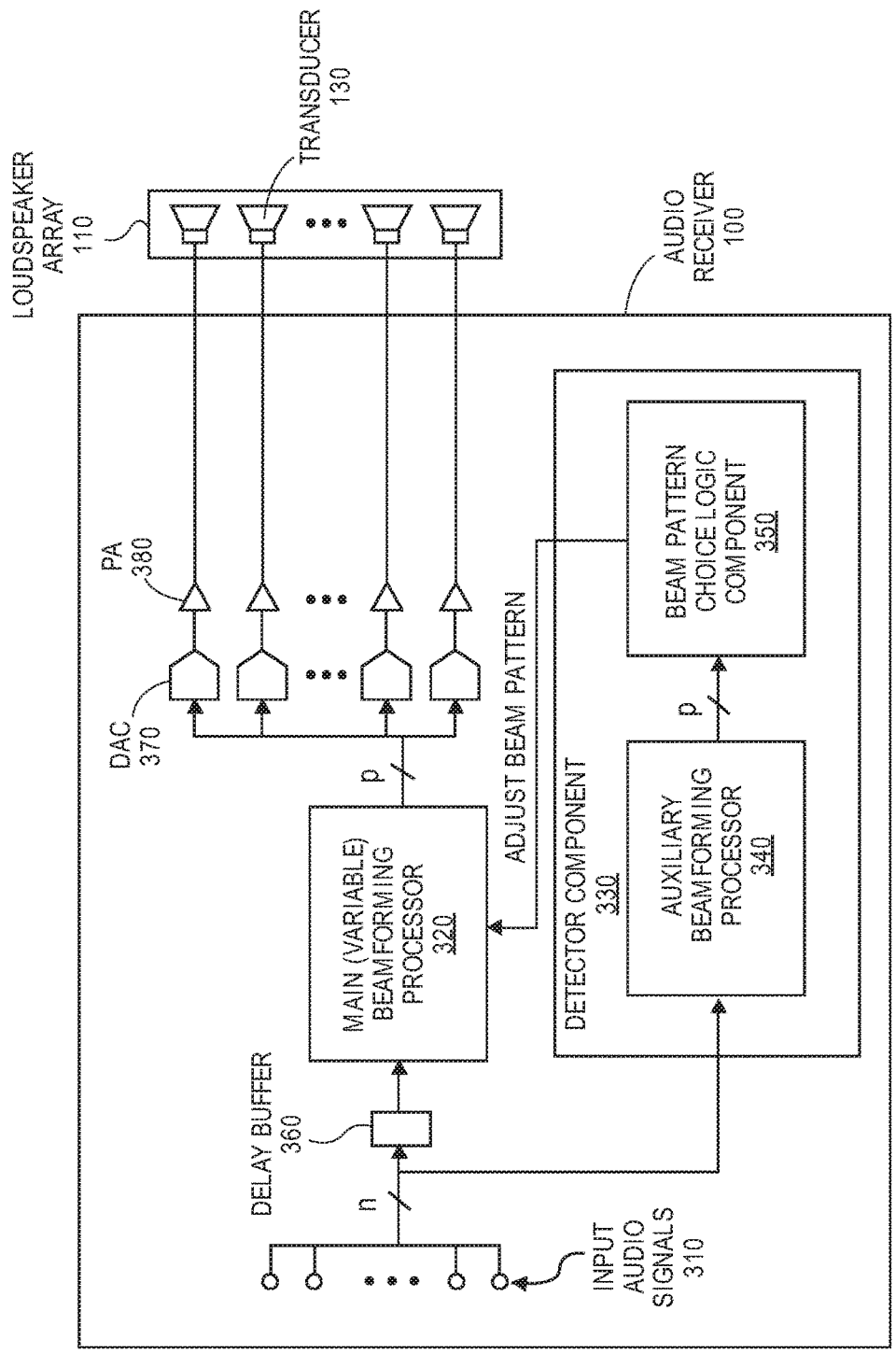
FIG. 3 is a block diagram illustrating an audio receiver that drives a loudspeaker array, according to some embodiments.

FIG. 3 is a block diagram illustrating an audio receiver that drives a loudspeaker array, according to some embodiments. Although shown as separate, in one embodiment, the audio receiver 100 is integrated with the loudspeaker array 110. The components shown in the drawing are representative of elements included in the audio receiver 100 and should not be construed as precluding other elements. The audio receiver 100 may be any electronic device capable of processing audio signals, including a desktop computer, a laptop computer, a tablet computer, a mobile phone, and a television. The components of the audio receiver 100 may be implemented based on application-specific integrated circuits (ASICs), a general purpose microprocessor, a field-programmable gate array (FPGA), a digital signal controller, or a set of hardware logic structures.

The audio receiver 100 may include inputs for receiving audio signals representing sound content. The audio signals may be received in the form of electrical, radio, or optical signals from an external device. For example, the inputs may be a High-Definition Multimedia Interface (HDMI) input, an optical digital input (Toslink), or a coaxial digital input. In one embodiment, the audio receiver 100 receives audio signals through a wireless connection with an external device. In such an embodiment, the inputs include a wireless adapter for communicating with an external device using wireless protocols.

The audio receiver 100 receives one or more audio signals representing one or more channels of a sound content through the inputs. In one embodiment, a single audio signal containing six audio channels (e.g., a 5.1 signal) is received and a decoder (not shown) decodes the audio signal into six input audio signals 310. As shown, the audio receiver 100 operates upon n input audio signals 310. In other embodiments, the audio receiver 100 may operate upon a different number of input audio signals 310. The input audio signals 310 are fed to a detector component 330 and a main beamforming processor 320.

The main beamforming processor 320 applies a beam pattern to the input audio signals 310 to generate a set of beam-formed audio signals (e.g., p audio signals) that is used to drive the loudspeaker array 110. The main beamforming processor 320 is a variable beamforming processor that can be configured to apply any type of beam pattern to the input audio signals 310. In one embodiment, a user may select or otherwise specify a desired beam pattern to apply to the input audio signals 310. For example, the user may select the desired beam pattern by configuring settings of the audio receiver 100 or by configuring settings in an application that in turn configures the audio receiver 100. However, driving the loudspeaker array 110 with the user-selected beam pattern may cause one or more transducers 130 of the loudspeaker array 110 to operate beyond an operational threshold level, particularly in cases where the user-selected beam pattern is highly directional. In one embodiment, the operational threshold level is a level at which an audio signal intended for a transducer 130 of the loudspeaker array 110 begins to be clipped. In another embodiment, the operational threshold level is a level at which a transducer 130 of the loudspeaker array 110 becomes overloaded. Driving the loudspeaker array 110 with the user-selected beam pattern may cause clipping of some of the audio signals or otherwise overload a transducer 130 of the loudspeaker array 110, which may cause distortion and a reduction in the intended acoustic energy of the sound output.

As such, in one embodiment, the audio receiver 100 includes a detector component 330 to detect whether driving the loudspeaker array 110 with the user-selected beam pattern will cause one or more transducers 130 of the loudspeaker array 110 to operate beyond an operational threshold. If the detector component 330 determines that one or more transducers of the loudspeaker array 110 will operate beyond an operational threshold, the detector component 330 determines a new beam pattern that is less directional than the user-selected beam pattern, and configures the main beamforming processor 320 to drive the loudspeaker array 110 with the new beam pattern.

To this end, the detector component 330 includes an auxiliary beamforming processor 340 and a beam pattern choice logic component 350. The auxiliary beamforming processor 340 may apply the user-selected beam pattern to the input audio signals 310 to generate a set of simulated beam-formed audio signals. The set of simulated beam-formed audio signals are simulated in the sense that they are not used to actually drive the loudspeaker array 110, but they are used to simulate what would happen if the loudspeaker array 110 were to be driven with a given beam pattern. The set of simulated beam-formed audio signals is fed to the beam pattern choice logic component 350. The beam pattern choice logic component 350 analyzes the set of simulated beam-formed audio signals to determine whether driving of the loudspeaker array 110 using the set of simulated beam-formed audio signals will cause one or more transducers 130 of the loudspeaker array 110 to operate beyond an operational threshold level. In one embodiment, the beam pattern choice logic component 350 determines whether an operational threshold level is exceeded based on peak or root mean square (RMS) sensing. In one embodiment, the beam pattern choice logic component 350 has knowledge of the operational characteristics of the transducers 130 of the loudspeaker array 110 and uses this knowledge to determine whether driving of the loudspeaker array 110 using the set of simulated beam-formed audio signals will cause one or more transducers 130 of the loudspeaker array 110 to operate beyond an operational threshold level. For example, the beam pattern choice logic component 350 may have knowledge of when a transducer 130 of the loudspeaker array 110 will become overloaded. In one embodiment, the beam pattern choice logic component 350 may have knowledge of when an audio signal intended for a transducer 130 of the loudspeaker array 110 will be clipped, and uses this knowledge to determine whether driving of the loudspeaker array 110 using the set of simulated beam-formed audio signals will cause one or more transducers 130 of the loudspeaker array 110 to operate beyond an operational threshold level.

If the beam pattern choice logic component 350 determines that driving of the loudspeaker array 110 using the set of simulated beam-formed audio signals will cause one or more transducers 130 of the loudspeaker array 110 to operate beyond an operational threshold level, the beam pattern choice logic component 350 determines a new beam pattern that is less directional than the user-selected beam pattern. The beam pattern choice logic component 350 may have knowledge of the user-selected beam pattern and can use this knowledge to determine a new beam pattern that is less directional than the user-selected beam pattern. In one embodiment, the beam pattern choice logic component 350 determines a new beam pattern that is less directional than the user-selected beam pattern and that produces essentially a same amount of acoustic energy as the user-selected beam pattern when used to drive the loudspeaker array 110 (e.g., within plus or minus 5 percent of the total acoustic energy). For example, if the user-selected beam pattern is the third order beam pattern 210 depicted in FIG. 2, the beam pattern choice logic component 350 may choose the cardioid beam pattern 220 depicted in FIG. 2 to be the new beam pattern since it is less directional and will produce essentially the same amount of acoustic energy as the user-selected beam pattern. In one embodiment, the acoustic energy is measured in terms of the total amount of voltage that is applied to the transducers 130 of the loudspeaker array 110. In one embodiment, the beam pattern choice logic component 350 has knowledge of the operational characteristics of the transducers 130 in the loudspeaker array 110 (e.g., when a transducer 130 becomes overloaded) and/or when clipping of an audio signal occurs, and uses this knowledge to determine a new beam pattern that when used to drive the loudspeaker array 110 will cause all of the transducers 130 of the loudspeaker array 110 to operate below an operational threshold level. After determining the new beam pattern, the beam pattern choice logic component 350 configures the main beamforming processor 320 to apply the new beam pattern to the input audio signals 310.

In one embodiment, the audio receiver 100 includes a delay buffer 360 to temporarily store the input audio signals 310 so as to delay the input audio signals 310 from being processed by the main beamforming processor 320 until the beam pattern choice logic component 350 configures the main beamforming processor 320 with the new beam pattern. As such, the delay introduced by the delay buffer 360 should preferably be long enough for the beam pattern choice logic component 350 to configure the main beamforming processor 320 with the new beam pattern. Thus, such an embodiment that includes the delay buffer 360 is an open-loop feed-forward implementation that "looks ahead" to see if driving the loudspeaker array 110 with the user-selected beam pattern will cause transducers 130 in the loudspeaker array 110 to operate beyond an operational threshold level before configuring the main beamforming processor 320. As such, this embodiment does not require feedback of audio signals. An embodiment that implements a closed-loop feed-back technique is described with reference to FIG. 4 below.

After the main beamforming processor 320 is configured to apply the new beam pattern, the main beamforming processor 320 receives the input audio signals 310 from the delay buffer 360 and applies the new beam pattern to the input audio signals 310 to generate a set of beam-formed audio signals. The set of beam-formed audio signals is used to drive the loudspeaker array 110. The set of beam-formed audio signals may be fed to one or more digital-to-analog converters (DACs) 370 to produce one or more analog signals. The analog signals produced by the DACs 370 may then be fed to one or more power amplifiers (PAs) 380 to drive the transducers 130 of the loudspeaker array 110 to produce beam-formed sound content.

In one embodiment, the beam pattern choice logic component 350 may configure the main beamforming processor 320 to apply a beam pattern that is more directional than the current beam pattern being applied to the input audio signals 310. For example, this may be in response to the beam pattern choice logic component 350 determining that the current beam pattern being applied to the input audio signals 310 causes all of the transducers 130 of the loudspeaker array 110 to operate below an operational threshold level, which indicates that there is extra capacity to increase directivity, if desired. Thus, the beam pattern choice logic component 350 can dynamically configure the main beamforming processor 320 to apply beam patterns that are less directional or more directional, as needed.

In one embodiment, the beam pattern choice logic component 350 configures the main beamforming processor 320 to gradually change the beam pattern applied to the input audio signals 310 over time. This may produce a more pleasant change in sound that is output by the loudspeaker array 110 compared to abruptly adjusting the beam pattern in a single step. For example, when going from a more directional beam pattern to a less directional beam pattern, the beam pattern choice logic component 350 may configure the main beamforming processor 320 to apply one or more intermediate beam patterns (e.g., beam patterns that are less directional than the more directional beam pattern but more directional than the less directional beam pattern) to the input audio signals 310 over a period of time, in order of decreasing directionality. The gradual change of the beam patterns may happen over any length of time. Likewise, similar operations for gradually adjusting the beam pattern over time can be performed when going from a less directional beam pattern to a more directional beam pattern.

Figure 4:
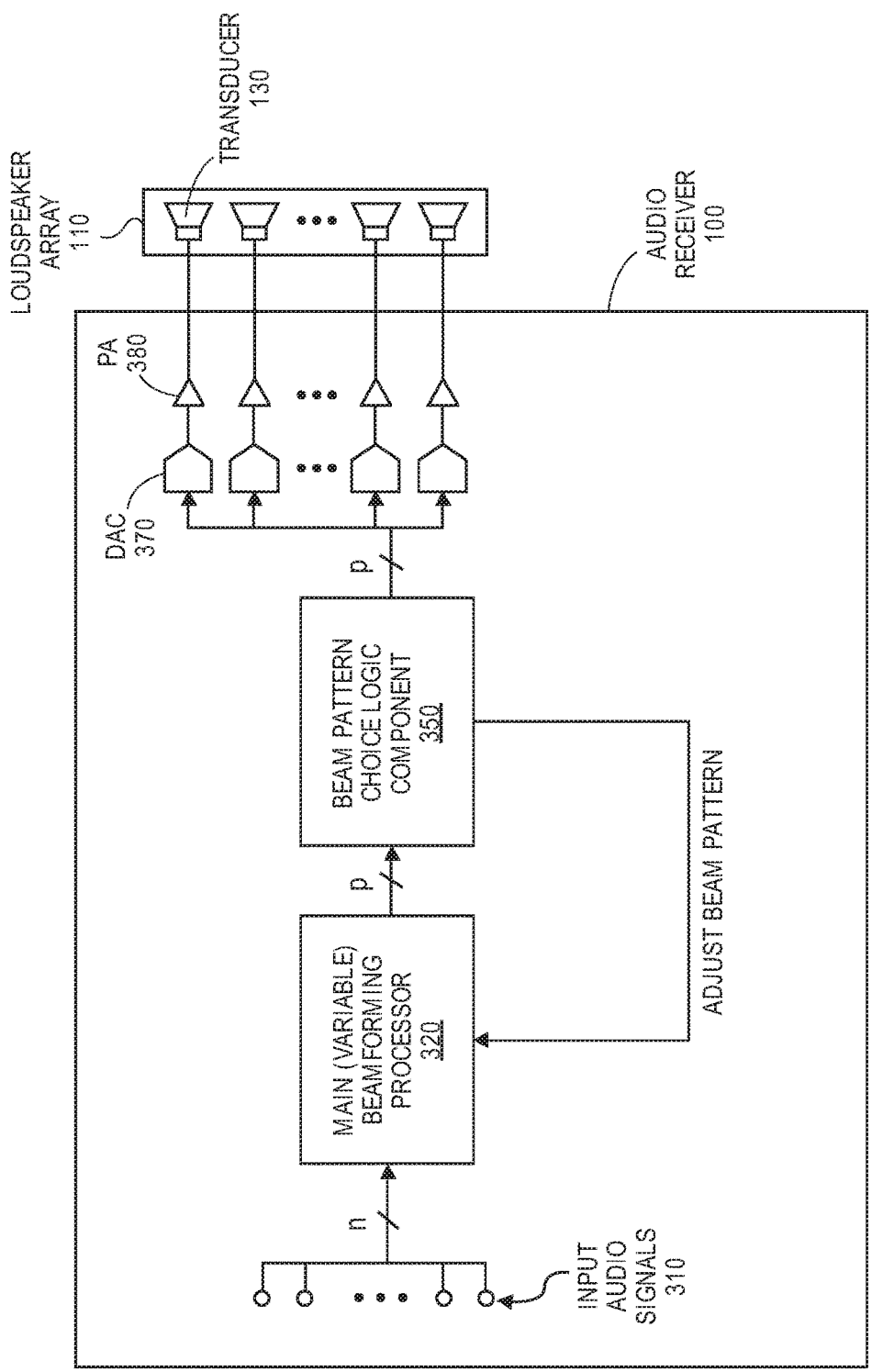
FIG. 4 is a block diagram illustrating another audio receiver that drives a loudspeaker array, according to some embodiments.

FIG. 4 is a block diagram illustrating another audio receiver that drives a loudspeaker array, according to some embodiments. FIG. 4 illustrates a closed-loop feed-back implementation. The audio receiver 100 operates on n input audio signals 310. The main beamforming processor 320 applies a user-selected beam pattern to the input audio signals 310 to generate a set of beam-formed audio signals that is used to drive the loudspeaker array 110. The set of beam-formed audio signals is fed into a beam pattern choice logic component 350. The beam pattern choice logic component 350 feeds the set of beam-formed audio signals to the DACs 370 and the PAs 380 to drive the loudspeaker array 110. The beam pattern choice logic component 350 also analyzes the set of beam-formed audio signals to determine whether driving of the loudspeaker array 110 using the set of beam-formed audio signals causes one or more transducers 130 of the loudspeaker array 110 to operate beyond an operational threshold level. If the beam pattern choice logic component 350 determines that driving of the loudspeaker array 110 using the set of beam-formed audio signals causes one or more transducers 130 of the loudspeaker array 110 to operate beyond an operational threshold level, the beam pattern choice logic component 350 determines a new beam pattern that is less directional than the user-selected beam pattern. The beam pattern choice logic component 350 may have knowledge of the user-selected beam pattern and can use this knowledge to determine a new beam pattern that is less directional than the user-selected beam pattern. The beam pattern choice logic component 350 then configures the main beamforming processor 320 to apply the new beam pattern to the input audio signals 310. In this way, a closed-loop feedback is created for analyzing and adjusting the beam pattern.

As described above with relation to FIG. 3, the beam pattern choice logic component 350 can dynamically configure the main beamforming processor 320 to apply beam patterns that are less directional or more directional than the current beam pattern being applied to the input audio signals 310, as needed. Also, the beam pattern choice logic component 350 can configure the main beamforming processor 320 to gradually change the beam pattern applied to the input audio signals 310 over time.

Figure 5:
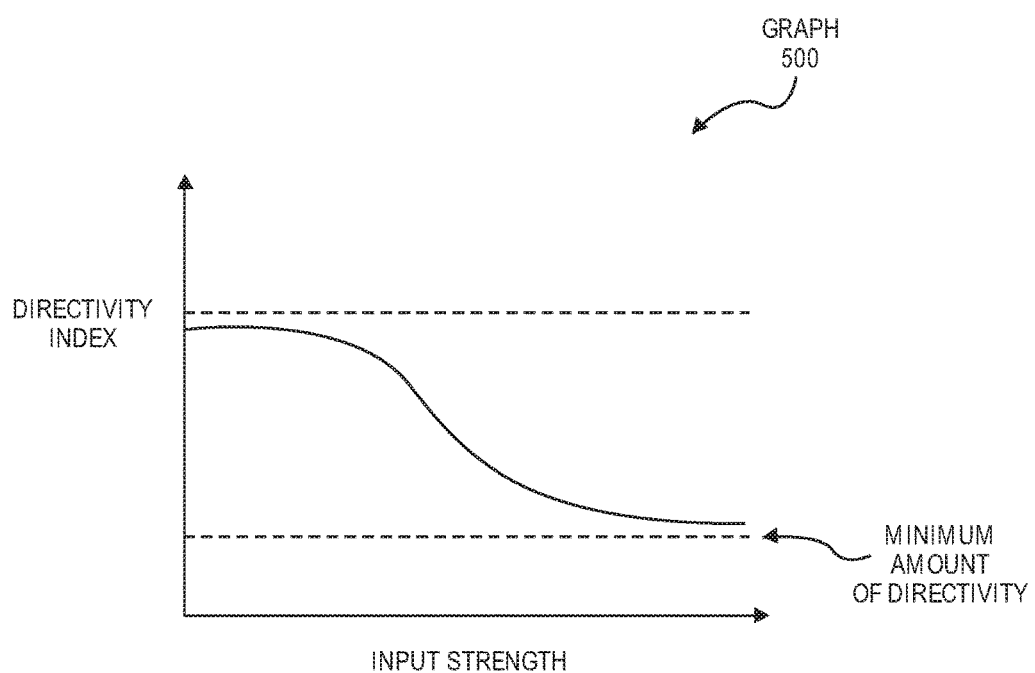
FIG. 5 is a graph illustrating a relationship between input strength and directivity index, according to some embodiments.

FIG. 5 is a graph illustrating a relationship between input strength and directivity index, according to some embodiments. The graph 500 illustrates an example of how the audio receiver 100 (and more particularly, the beam pattern choice logic component 350 of the audio receiver 100) may adjust directivity relative to input strength. The x-axis represents input strength and the y-axis represents directivity index. As the input strength increases, the beam pattern choice logic component 350 lowers the directivity of the beam pattern, for example, to avoid clipping or overloading a transducer 130 in the loudspeaker array 110. However, past a certain level of input strength, the beam pattern choice logic does not significantly lower the directivity, but instead maintains a minimum amount of directivity even as input strength increases. This behavior maintains some amount of directivity even though this may cause clipping or overload a transducer 130 in the loudspeaker array 110. In other embodiments, the beam pattern choice logic component 350 may adjust the directivity in a different manner. For example, the beam pattern choice logic component 350 may continue to lower the directivity of the beam pattern as input strength increases until reaching a beam pattern with little to no directivity (e.g., an omni beam pattern).

An embodiment may be an article of manufacture in which a machine-readable storage medium has stored thereon instructions which program one or more data processing components (generically referred to here as a "processor") to perform any of the operations described above. For example, a non-transitory machine-readable storage medium may store instructions that program a processor to perform the operations of the audio receiver 100. Examples of machine-readable storage mediums include read-only memory, random-access memory, CD-ROMs, DVDs, magnetic tape, optical data storage devices, and carrier waves. The machine-readable storage medium can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad disclosure, and that this disclosure is not limited to the specific constructions and arrangements shown and described, since various other modifications may occur to those of ordinary skill in the art.

What is claimed is:

1. A method for adjusting audio signals for driving a loudspeaker array, comprising:
   receiving one or more input audio signals representing one or more channels of sound content;
   applying a first beam pattern to the input audio signals to generate a first set of beam-formed audio signals;
   determining a second beam pattern that is less directional than the first beam pattern;
   determining that driving of the loudspeaker array using the first set of beam-formed audio signals will cause one or more transducers of the loudspeaker array to operate beyond an operational threshold level, and in response applying the second beam pattern to the input audio signals to generate a second set of beam-formed audio signals; and
   driving the loudspeaker array using the second set of beam-formed audio signals.

2. The method of claim 1, wherein the first set of beam-formed audio signals and the second set of beam-formed audio signals produce a same amount of acoustic energy when driving the loudspeaker array.

3. The method of claim 1, wherein the determining that driving of the loudspeaker array using the first set of beam-formed audio signals will cause one or more transducers of the loudspeaker array to operate beyond an operational threshold level is based on operational characteristics of the one or more transducers of the loudspeaker array.

4. The method of claim 1, wherein the operational threshold level is a level at which an audio signal intended for a transducer of the loudspeaker array starts to be clipped.

5. The method of claim 1, wherein driving the loudspeaker array using the second set of beam-formed audio signals causes the transducers of the loudspeaker array to operate below the operational threshold level.

6. The method of claim 1, further comprising:
   applying an intermediate beam pattern to the input audio signals to generate an intermediate set of beam-formed audio signals, wherein the intermediate beam pattern is less directional than the first beam pattern, but more directional than the second beam pattern; and
   driving the loudspeaker array using the intermediate set of beam-formed audio signals before driving the loudspeaker array using the second set of beam-formed audio signals.

7. The method of claim 1, further comprising:
   determining a third beam pattern that is more directional than the second beam pattern;
   determining that driving of the loudspeaker array using the second set of beam-formed audio signals causes one or more transducers of the loudspeaker array to operate below an operational threshold level, and in response applying the third beam pattern to the input audio signals to generate a third set of beam-formed audio signals; and
   driving the loudspeaker array using the third set of beam-formed audio signals.

8. The method of claim 1, further comprising:
   driving the loudspeaker array using the first set of beam-formed audio signals.

9. The method of claim 1, further comprising:
   storing the input audio signals in a delay buffer while determining that driving of the loudspeaker array using the first set of beam-formed audio signals will cause one or more transducers of the loudspeaker array to operate beyond an operational threshold level.

10. A computer system, comprising:
    a loudspeaker array;
    one or more inputs to receive one or more input audio signals representing one or more channels of sound content;
    a processor;
    a memory to store instructions, which when executed by the processor causes the computer system to:
       receive the one or more input audio signals;
       apply a first beam pattern to the input audio signals to generate a first set of beam-formed audio signals;
       determine a second beam pattern that is less directional than the first beam pattern;
       determine that driving of the loudspeaker array using the first set of beam-formed audio signals will cause one or more transducers of the loudspeaker array to operate beyond an operational threshold level, and in response apply the second beam pattern to the input audio signals to generate a second set of beam-formed audio signals; and
       drive the loudspeaker array using the second set of beam-formed audio signals.

11. The computer system of claim 10, wherein the first set of beam-formed audio signals and the second set of beam-formed audio signals produce a same amount of acoustic energy when driving the loudspeaker array.

12. The computer system of claim 10, wherein the first beam pattern is a third order beam pattern and the second beam pattern is a cardioid beam pattern.

13. The computer system of claim 10, wherein the operational threshold level is a level at which an audio signal intended for a transducer of the loudspeaker array starts to be clipped.

14. A non-transitory machine readable storage medium having instructions stored therein, the instructions when executed by a processor in a computer system, causes the computer system to perform a set of operations comprising:
- receiving one or more input audio signals representing one or more channels of sound content;
- applying a first beam pattern to the input audio signals to generate a first set of beam-formed audio signals;
- determining a second beam pattern that is less directional than the first beam pattern;
- determining that driving of the loudspeaker array using the first set of beam-formed audio signals will cause one or more transducers of the loudspeaker array to operate beyond an operational threshold level, and in response applying the second beam pattern to the input audio signals to generate a second set of beam-formed audio signals; and
- driving the loudspeaker array using the second set of beam-formed audio signals.

15. The non-transitory computer readable storage medium of claim 14, wherein the first set of beam-formed audio signals and the second set of beam-formed audio signals produce a same amount of acoustic energy when driving the loudspeaker array.

16. The non-transitory computer readable storage medium of claim 14, wherein the determining that driving of the loudspeaker array using the first set of beam-formed audio signals will cause one or more transducers of the loudspeaker array to operate beyond an operational threshold level is based on operational characteristics of the one or more transducers of the loudspeaker array.

17. The non-transitory computer readable storage medium of claim 14, wherein the operational threshold level is a level at which an audio signal intended for a transducer of the loudspeaker array starts to be clipped.

18. The non-transitory computer readable storage medium of claim 14, wherein driving the loudspeaker array using the second set of beam-formed audio signals causes the transducers of the loudspeaker array to operate below the operational threshold level.

19. The non-transitory computer readable storage medium of claim 14, wherein the instructions when executed by the computer system, cause the computer system to perform a further set of operations comprising:
- applying an intermediate beam pattern to the input audio signals to generate an intermediate set of beam-formed audio signals, wherein the intermediate beam pattern is less directional than the first beam pattern, but more directional than the second beam pattern; and
- driving the loudspeaker array using the intermediate set of beam-formed audio signals before driving the loudspeaker array using the second set of beam-formed audio signals.

20. The non-transitory computer readable storage medium of claim 14, wherein the instructions when executed by the computer system, cause the computer system to perform a further set of operations comprising:
- determining a third beam pattern that is more directional than the second beam pattern;
- determining that driving of the loudspeaker array using the second set of beam-formed audio signals causes one or more transducers of the loudspeaker array to operate below an operational threshold level, and in response applying the third beam pattern to the input audio signals to generate a third set of beam-formed audio signals; and
- driving the loudspeaker array using the third set of beam-formed audio signals.

* * * * *